April 17, 1951 M. K. VON ZIMMERMANN 2,549,548

SYSTEM FOR AUTOMATICALLY TRANSMITTING AND RECEIVING TELEPHONE MESSAGES

Filed Dec. 10, 1947 2 Sheets-Sheet 1

INVENTOR.
M. KURT VON ZIMMERMANN

BY

Albert Sperry

ATTORNEY

INVENTOR.
M. KURT VON ZIMMERMANN
BY Albert Sperry,
ATTORNEY

Patented Apr. 17, 1951 | 2,549,548

UNITED STATES PATENT OFFICE 2,549,548

SYSTEM FOR AUTOMATICALLY TRANSMITTING AND RECEIVING TELEPHONE MESSAGES

Max Kurt von Zimmermann, Trenton, N. J.

Application December 10, 1947, Serial No. 790,908

3 Claims. (Cl. 179—6)

This invention relates to mechanism for transmitting and receiving signals and is directed particularly to mechanism adapted for use with a telephone system and responsive to the usual ringing signal for initiating a cycle of operations for transmitting a recorded message and for recording an incoming message so that the mechanism will operate to send and receive messages in the absence of the party being called.

In accordance with the present invention the mechanism provided is adapted for use in combination with a conventional telephone transmitter and receiver, and the recording and transmitting means employed may be any conventional or suitable recorder and reproducer, such as wire type or disc type recorders, several of which are now on the market and sold under the trade names "Electronic Dictaphone," "Audograph" and "Sound Scriber." The user can therefore couple the apparatus to equipment already installed and in conventional use in order that messages may be automatically transmitted and received in his absence and so that they may thereafter be read back upon his return or at a convenient time and as often as required. For this purpose the apparatus is responsive to an incoming call such as a telephone ringing signal for initiating a cycle of operations whereby the telephone receiver is raised from its support to complete the telephone circuit. A message is then transmitted to the calling party and thereafter the reply of the calling party is recorded whereupon the mechanism is operable to return the receiver to its support to open the telephone circuit and restore the mechanism to a condition of readiness for transmitting and receiving subsequent messages. Any desired number of messages may be transmitted and received and the messages may be the same or may each be different, the limitations of operation being only those imposed by the type of recording and reproducing mechanism employed. Furthermore, the apparatus in no way interferes with the normal use of the telephone equipment and the recorder may be used for dictation or other purposes in the normal course of business when the present invention is not in operation.

One of the objects of my invention is to provide a novel type of apparatus for use with a telephone whereby messages may be automatically transmitted and received.

Another object of the invention is to provide apparatus adapted for use in combination with conventional telephone and recording equipment.

A further object of the invention is to provide apparatus for automatically recording and transmitting telephone messages without interfering with the normal operation and use of a telephone.

These and other objects and features of the invention will appear from the following description thereof in which reference is made to the figures of the accompanying drawings.

Figure 3:
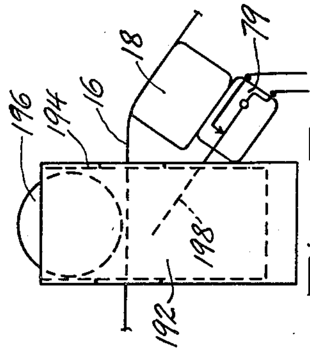
Fig. 3 is an enlarged view, partly diagrammatic, showing a portion of the mechanism including the feeler switch.

In that form of the invention chosen for purposes of illustration in the drawings, the control mechanism is indicated generally at 2 and is provided with a platform 4 upon which may be placed a conventional telephone pick-up 5 which is connected by the conductor 7 to the microphone input jack of the recorder, and serves as a base upon which is positioned the usual telephone sending and receiving set having a stand 6 and a receiver 8. The control mechanism is connected electrically with a recorder 10 which as shown is a wire type recorder of the type known as a "Peirce Wire Recorder." This type of recorder has a supply spool 12 and a take-up spool 14 between which the recording wire 16 passes over a sound head 18.

The apparatus is provided with an "actuating circuit" and a "control circuit." The actuating circuit includes a signal responsive relay 20 for initiating a cycle of operations and a locking and reset relay 22 for maintaining the actuating circuit closed after receipt of a ringing signal. If desired the recorder may be energized and maintained continuously in readiness to receive and record messages, but for most practical and normal usage, and as here shown, the actuating circuit further includes means which serve to cause the filaments of the recorder amplifier, detector and rectifier tubes to be energized and heated to readiness immediately upon reception of a ringing signal, whereas time delay means 24 are provided to delay lifting of the receiver until the filaments of the tubes are heated up say for 10 seconds, or until after the second or third ringing signal has been received. Thereafter the actuating circuit serves to cause the receiver to be raised and the control circuit is closed to start the message transmitting and receiving cycle of operations. In this way the recorder amplifying tubes need only be energized during each cycle of operations and when a message is actually to be transmitted and recorded.

The control circuit includes a repeating timer 26 for controlling the duration and sequence of the transmitting and recording operations and for terminating the cycle so that the system will be restored to a condition for reuse at the conclusion of each cycle. The relays and repeating timer as well as other elements of the apparatus are contained in a control box 28.

Figure 1:
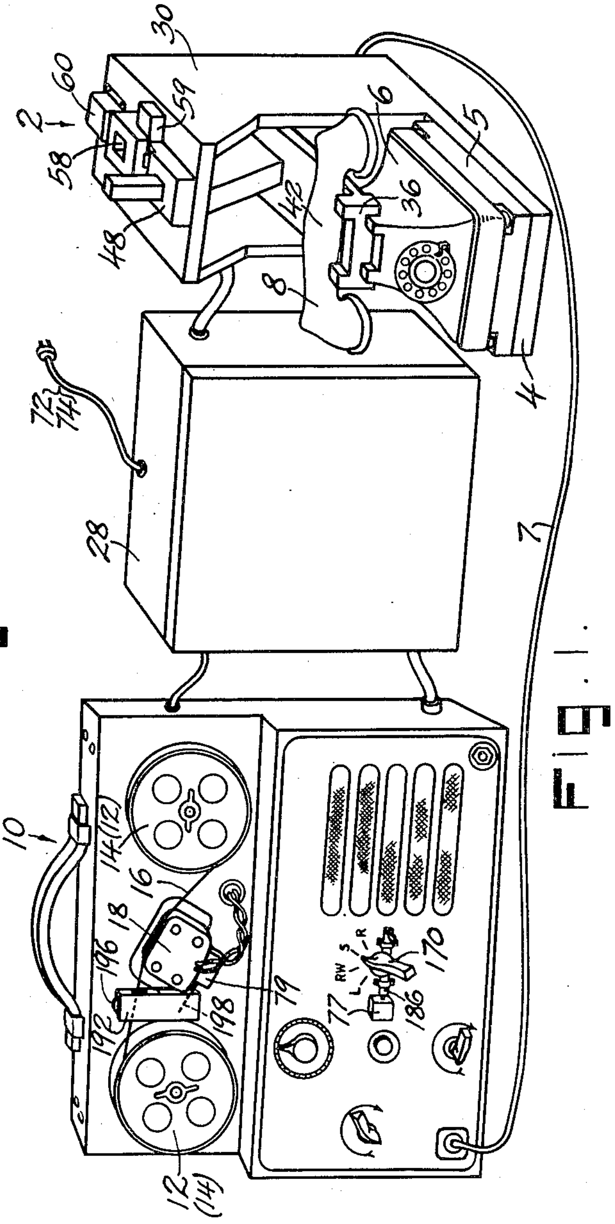
Fig. 1 is a perspective of a typical form of apparatus embodying my invention and adapted for use with a conventional telephone and recording equipment.
Figure 2:
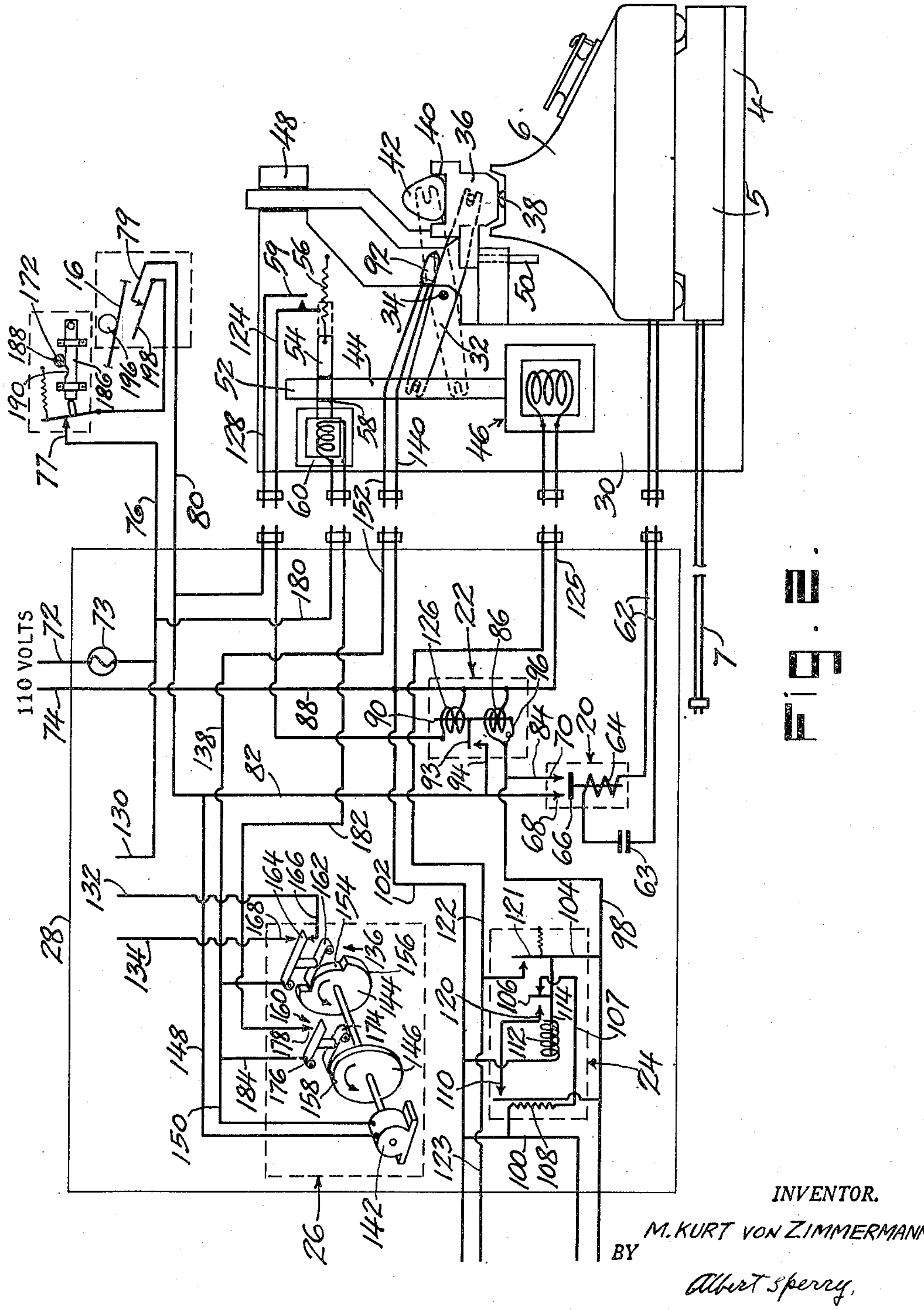
Fig. 2 is a diagrammatic illustration of the mechanism illustrated in Fig. 1 showing a typical circuit arrangement.

As shown in Figs. 1 and 2 the actuating mechanism embodies a housing 30 within which is located an actuating lever 32 pivotally mounted at 34 and connected at its outer end to a lifting block 36, which, when the apparatus is not in operation, is positioned to engage the spring pressed buttons 38 upon which the telephone receiver normally rests. The upper surface of the lifting block 36 is formed with a cradle 40 for receiving the handle 42 of the receiver 8. Thus, as shown in Figs. 1 and 2 when the lifting block is in its lowered position the spring pressed buttons 38 are depressed so that the telephone receiving circuit is open, whereas the receiver itself is supported by the lifting block in position to be raised after the receipt of a ringing signal and upon operation of the delay relay 24. The opposite end of the actuating lever 32 is connected to the plunger 44 of a solenoid 46 so that when the solenoid is energized the plunger 44 will move downward and the actuating lever 32 will be rocked about its pivot 34 to raise the lifting block 36 and the receiver 8 whereby the spring pressed pins 38 on the telephone stand will rise to close the telephone circuit for receiving and sending messages. The lifting block 36 is guided in its movement as it is raised and lowered by a sleeve 48 and the pins 50 on housing 30.

The plunger 44 extends upward above the actuating lever 32 and has its upper end 52 engageable by a latch plate 54 which is normally urged toward a latching position by the spring 56. Any suitable form of latching elements may be provided, but as shown the latch plate 54 is provided with an opening 58 through which the upper end 52 of the plunger 44 protrudes when the apparatus is not in use. However, when solenoid 46 is energized and the plunger 44 is moved downward, the latch plate 54 then will move to the right as seen in Fig. 2 by action of the spring 56 and to the dotted line position in which it extends over the upper end 52 of the plunger so that plunger 44 will be held down. The actuating lever 32 is thus held in its tilted dotted line position as seen in Fig. 2 and the telephone receiver and lifting block 36 are held in raised positions to maintain the telephone circuit closed until completion of a cycle of operations.

Tilting of the actuating lever 32 to the dotted line position of Fig. 2 also serves to complete the control circuit and in order to avoid hum or interference in the telephone circuit due to continuous operation of solenoid 46 and other elements of the actuating circuit, means are provided for breaking the actuating circuit when the latch plate 54 is moved to its plunger holding position. For this purpose a control switch 92 is included in the control circuit and arranged to be closed when the actuating lever 32 is tilted so that the control circuit will be completed whereas a circuit resetting switch 59 is included in the actuating circuit and is closed when the latch plate moves to its holding position. The circuit resetting switch operates to release and reset the locking relay 22 whereby the actuating circuit is broken and restored to its original condition so that it will be prepared to respond to a subsequent ringing signal after the ensuing cycle of recording and transmitting operations has been concluded. The solenoid 46 and related elements in the actuating circuit are thus deenergized as soon as the receiver and lifting block are raised and the telephone circuit is rendered free of external interference during the transmitting and receiving operations.

When the operating cycle has been completed by operation of the timing mechanism 26 the latch plate 54 is moved to the left as seen in Fig. 2 against the action of spring 56 by means of the solenoid 60 included in the control circuit. When so moved the latch plate is restored to the full line position of Fig. 2 and the opening 58 is positioned above the end 52 of the plunger 44. The plunger is then free to rise and the operating lever 32 is moved back to the full line position of Fig. 2 as the lifting block 36 and the receiver 8 are lowered due to the weight thereof. When the lifting block and receiver are thus lowered the spring pressed pins 38 on the telephone stand 6 are depressed and the telephone circuit is broken. At the same time the control switch 92 is opened breaking the control circuit and the circuit resetting switch 59 is opened so that the circuits and apparatus are restored to conditions of readiness for transmitting and receiving succeeding messages.

The signal responsive relay 20 which initiates each cycle of operation is designed to be actuated by the receipt of a signal such as the usual telephone ringing signal and may be coupled electrically, inductively or acoustically to the telephone or the ringing circuit so that the relay 20 will close as soon as the telephone bell is rung. As shown, the relay is connected to the ringing circuit by conductors 62 and includes the condenser 63 and the relay windings 64 which serve to move the contact member 66 into engagement with the contacts 68 and 70 on receipt of a ringing signal.

Current is supplied to the actuating circuit from a 110 volt line including the conductors 72 and 74. When contact 66 is closed current flows from conductor 72 through the fuse 73 and conductors 76 past the closed safety switch 77 and the normally closed feeler switch 79 hereafter referred to. From the feeler switch 79 current flows through conductors 80 and 82 to the contact 68. Current flowing through the closed contact member 66 of the signal responsive relay then passes to contact 70 and through conductor 84 to the lower winding 86 of the locking and reset relay 22 and back through conductor 88 to the opposite conductor 74 of the power line. When the lower winding 86 of relay 22 is thus energized the armature 90 is lowered to move contact arm 93 into engagement with contact 94 connected to conductor 82. A circuit is thereby completed from conductor 82 through contact 94, contact arm 93, armature 90 and conductor 96 to the conductor 84 and thence through the winding 86 back to conductor 88 and the opposite side 74 of the power line. The flow of current through winding 86 is thus maintained after the initial ringing signal has ceased and when the contact member 66 has disengaged the contacts 68 and 70.

The closing of contact 66 and the continued flow of current established by the locking and reset relay 22 also serves to insure a continued supply of current to the conductor 98 connected to the filament transformer (not shown) of the recording mechanism so that the filaments of the various tubes employed start to heat up as soon as a ringing signal is received. Current returns from the filament transformer through conductors 100, 102 and 88 to the conductor 74 of the power line. At the same time the time delay relay 24 is set in operation by the flow of current from conductor 98 through conductor 104 and contact 106 to conductor 107 and the heating element 108. Current flows from the heating element 108 through conductors 102 and 88 back to the conductor 74 of the power line. After a predetermined period of time, say 10 seconds, the heating element 108 of the time delay relay operates to close the contact 110 whereby current flows through the winding 112 of relay 24 to conductor 102. Armature 114 is then moved to the left as seen in Fig. 2, breaking the contact 106 to allow the heating element 108 to cool off while closing of contact 120 to maintain the flow of current through winding 112 so as to hold the circuit closed. The contact arm 121 is also actuated by movement of the armature 114 to the left and serves to complete a circuit extending from conductor 98 to conductor 123 connected to the plate transformer (not shown) of the recording mechanism, and to conductor 122 which extends to the solenoid 46. From the solenoid 46 current flows through conductors 125 and 88 back to the conductor 74 of the power line.

By means of this circuit arrangement the locking and reset relay 22 serves to insure continued flow of current in the actuating circuit after the signal responsive relay has once been actuated and until the time delay relay 24 has responded to energize solenoid 46 of the control mechanism. Moreover, lifting of the receiver by the control mechanism is delayed until the filaments of the amplifying, detecting and rectifying tubes of the recording mechanism have been heated sufficiently to insure proper transmission and recording of messages. When the actuating circuit energizes solenoid 46 plunger 44 moves downward causing the actuating lever 32 to rock about its pivot 34 so that the receiver is raised to complete the telephone circuit and the control circuit is closed by operation of the control switch 92.

When plunger 44 is lowered and latch plate 54 moves to hold the plunger down, the plate engages the circuit resetting switch 59 and closes this switch. Current then flows from power line conductor 72 to conductor 80 and through conductor 128 to the resetting switch 59. From the latter switch current flows through conductor 124 to the upper winding 126 of the locking and resetting relay 22 and thence back through conductor 88 to the opposite conductor 74 of the power line. The winding 126 is more powerful than the winding 86 of the locking and resetting relay 22 and therefore serves to move the armature 90 upward so that contact member 93 is moved out of engagement with contact 94. The locking circuit including winding 86 is thus broken, and relay 22 is restored to its original condition in readiness for operation in response to a succeeding ringing signal at a later time. In this way the actuating circuit is broken and rendered inactive when the telephone circuit is closed.

Movement of the operating lever 32 to raise the lifting block and receiver serves to close the control switch 92, which is preferably a mercury switch positioned so that it will close and complete the control circuit when the operating lever is moved to the dotted line position shown in Fig. 2. When the switch 92 is closed current is supplied to the transformer and amplifier tubes from conductor 72 of the power line to conductor 130 and the conventional circuits of the recorder flowing back to the conductor 74 of the power line through one or the other of the conductors 132 and 134, the switch 136, conductor 138 and the mercury control switch 92 which is connected by conductor 140 to conductor 88 and power line conductor 74. In the same way, current is supplied to other elements of the recorder (not shown) such as the motor which drives the supply and take-up spools 12 and 14 by which the recording wire 16 is carried and advanced during transmitting and receiving operations.

The closing of switch 92 also serves to initiate operation of the timing mechanism 26 which controls the duration and sequence of the recording and reproducing operations. The timing mechanism includes a motor 142 for actuating a switching cam 144 and a circuit breaking cam 146. Current is supplied to the motor 142 from power line 72 through conductor 148 whereas the opposite side of the motor is connected to the switch 92 by the conductors 150 and 152. The motor 142 is thus energized by closing of the switch 92 to initiate a message transmitting and receiving cycle and to cause the timing mechanism to be actuated to assure the desired sequence and duration of recording and receiving operations. The switching cam 144 and the circuit breaking cam 146 of the timing mechanism are driven at predetermined speeds on operation of the motor 142 and are rotated in the direction of the arrows shown in Fig. 2. The switching cam 144 is suitably formed to cause the recorder to perform the desired sequence of reproducing and recording operations and as illustrated is provided with a recessed arc 154 extending through approximately 90° of its circumference and a raised arc 156 extending through the remaining 270° of its circumference. The circuit breaking cam 146 is provided with a single relatively sharp recess 158.

Cam 144 serves to actuate switch 136 and cam 146 actuates switch 160. The two cams are so positioned with respect to each other and with respect to the switches they actuate that each cam will make a single full rotation in each cycle of operation and at the start and conclusion of each cycle the cams will be in the positions shown in Fig. 2. Switch 136 includes a leaf actuator 162 which serves as a cam follower and is movable to actuate the switch arm 164 so as to cause it to engage either the transmitting contact 166 or the receiving contact 168. The contact 166 is connected to conductor 132 and contact 168 is connected to conductor 134 whereby operation of the switching cam by motor 142 serves to perform the functions which are otherwise performed manually by rotation of the control knob 170 on shaft 172 of the recorder when the recorder is used for conventional dictation purposes. It will be noted, however, that the switching cam effects a shift directly from the "Listen" to the "Record" positions instead of passing successively from the "Listen" position through the "Rewind" and "Stop" positions to the "Record" position as is usual in manual control of the recorder.

At the start of each cycle of operations the leaf actuator 162 is located at the beginning of the recessed arc 154 of the switching cam 144 and the switch arm 164 is in position to close a circuit through the transmitting contact 166 of the switch 136. On rotation of the switching cam 144 through 90° of its circumference the leaf actuator 162 rides up onto the raised arc 156 of the switching cam and thereby moves the contact arm 164 into engagement with the receiving contact 168 so as to cause the recorder to cease transmitting a message and begin receiving and recording a message. Thereafter, the recorder remains in its recording position until the completion of a cycle of operations when the leaf actuator 164 again drops into the recessed arc 154 of the switching cam 144.

Switch 160 has a leaf actuator 174 which actuates the switch arm 176 to move the switch arm into and out of engagement with the contact 178. When the leaf actuator drops into the recess 158 of the circuit breaking cam 146 a circuit is completed for actuating the solenoid 60. The circuit energizing solenoid 60 extends from power line 72 and conductor 76 through conductor 180 to the solenoid and then through conductor 182 to the contact 178 of switch 160. From contact 178 conductor 184 extends to conductors 138 and 152 and control switch 92 which is connected at its opposite side through conductors 140 and 88 to the other power line 74. Solenoid 60 is therefore operated on conclusion of a timing cycle and after the messages have been transmitted and received, say at the end of two minutes of operation. When solenoid 60 is thus energized it operates to retract the latch plate 54 against the action of spring 56 and thus serves to release the plunger 44 and allow the receiver and lifting block to return to their lower positions. The actuating lever 32 is thus tilted to the full line position shown in Fig. 2 whereby switch 92 is actuated to break the control circuit and terminate the operations concluding a cycle whereas circuit resetting switch 59 is allowed to open to place the actuating circuit in readiness for another cycle of operations.

The operation of solenoid 60 and movement of plunger 44 and operating lever 32 requires a slight interval of time during which the leaf actuator 174 of switch 160 rides up out of the recess 158 of the circuit breaking cam 146 and thus the timing cams are restored to their original positions and reset to initiate a new cycle of operations when the switch 92 is again actuated. In this way the apparatus is restored to its original condition for transmitting and receiving another message so that any number of messages may be transmitted and received one after another as long as there is any recording wire remaining available on the supply spool 12 of the recording mechanism.

The contacts 166 and 168 of switch 136 may be connected to the recorder in any desired manner to effect the shift from recording to receive operations and the circuits controlled will vary with the type of recording mechanism used. When employing the present invention with a Peirce wire recorder so as to effect "Remote Control" in response to a telephone ringing signal it is important to restore the recorder to a predetermined position and preferably the "Stop" position preparatory to automatic control in accordance with the present invention. For this purpose the safety switch 77 is provided and arranged to be closed by movement of the slide 186 to the full line position indicated in Fig. 2. The shaft 172 by which the manual control knob 170 is carried is formed with a flat side 188 engageable by the slide 186 to prevent turning of the knob and shaft when the slide 186 is in the "Remote Control" position for closing the safety switch 77. However, when moved to the right as seen in Fig. 2 a notch 190 is located adjacent to shaft 172 so that the shaft may be manually operated, but the safety switch will serve to break the circuit by which current is supplied for "Remote Control" operation.

As a further safeguard against faulty operation of the recorder, particularly in the absence of the user, the feeler switch 79 is provided for interrupting the flow of current to the recorder and mechanism in the event the wire 16 should break. For this purpose the sound head 18 is provided with a holder 192 as shown in Fig. 3 having a slot 194 therein into which a nickel or similar circular slug or disc 196 may be inserted. The slot 194 is located so that the wire 16 passes therethrough in position to support the slug 196. The normally closed feeler switch 79 is provided with an arm 198 below the wire 16 and therefore in the event the wire should break the slug will fall and engage the arm 198 to actuate the feeler switch and break the circuit, by which current is supplied to the recorder and mechanism. In this way it is possible to prevent injury to the recorder due to wrapping of the wire about the sound head or other elements in the absence of an observer.

When using the construction described a person who expects to be away from his office or telephone for some time may impress messages to be transmitted to the calling party on the wire 16 or other record receiving means at suitable intervals or spaces, as for repetition after every two minutes of operation, leaving the portion or space between the impressed outgoing messages blank to receive incoming replies. After the wire or record has thus been prepared it is rewound onto the supply spool or restored to a starting position. Thereafter as the user is about to leave the office he need only plug in or otherwise connect the apparatus to the power circuit conductors 72 and 74. Ordinarily the telephone is left in place on the apparatus so that the stand 6 of the telephone rests on the pick-up device 5 at all times, but if the telephone has been removed it is placed on the inductive pick-up device 5 on the platform 4 of the control mechanism. The receiver 8 is lifted from the stand 6 and is placed on the cradle 40 of the lifting block 36 whereby the combined weight of the receiver and the lifting block causes the block to move down into engagement with the spring pressed pins 38 which control the telephone circuit. The manual control knob 172 of the recorder is then turned to its "Stop" position and slide 186 is moved to the left as seen in Fig. 2 to close the safety switch 77. The nickel or slug 196 is normally allowed to remain in the slot 194 of the feeler switch on the sound head 18 and even if not employed the feeler switch 79 will normally remain closed.

When thus connected the user may leave the office and the messages previously impressed on the wire 16 will be sent out and incoming messages will be received time after time as long as there is wire on the supply spool 12. For example, when someone makes an incoming call the actuating circuit operates to cause the signal responsive relay 20 to respond on the initial ringing impulse whereby the locking and reset relay 22 is actuated to insure continued flow of current to the amplifier and other tubes of the recorder to heat the filaments thereof and place the recorder in readiness to transmit and receive messages. At the same time the time delay relay 24 is energized so that after the second or third ringing signal, that is after a predetermined time for which the relay 24 is adjusted, a circuit will be completed to energize the solenoid 46. The plunger 44 will then be moved downward and the actuating lever 32 will be tilted to raise the lifting block 36 and the receiver 8. The latch plate 54 will then be operated by spring 56 to hold the plunger 44 down and to hold the receiver 8 in its raised position so that the pins 38 on the receiver stand will rise to hold the telephone circuit closed until the cycle of operations has been completed. The latch plate further serves to actuate resetting switch 59 to energize the upper coil 126 of the locking and reset relay whereby the actuating circuit is broken and reset for subsequent operation when another telephone call is received.

Tilting of the operating arm 32 closes switch 92 whereby current is supplied to the motor 142 of the timing mechanism and a circuit is completed through switch 136 to cause the recorder motor to advance the wire 16 with its recorded message to the sound head 18 and to transmit the recorded message over the telephone. If the timing mechanism is designed to operate in cycles of two minutes each, the switching cam 136 will serve to cause the message previously impressed on the wire 16 to be impressed on the telephone line by the pick-up device 5 or in any other suitable manner as by operation of the loud speaker of the recorder 10. The outgoing message will thus be transmitted so that the calling party may be advised to deliver any reply or message desired in order that it may be recorded in the absence of the party being called. At the end of say thirty seconds of time allowed for transmitting the outgoing, previously recorded message, the switching cam 136 will have rotated through an arc of 90° by the motor 142 and the leaf actuator 162 of the switching relay will ride up onto the raised arc 156 so as to actuate switch 136 to shift the recording mechanism over to its receiving and recording condition. The incoming message will then be impressed upon the portion of the wire 16 between the successive previously recorded outgoing messages. After a period of one and a half minutes allowed for recording the incoming message, the circuit breaking cam 146 will operate to energize the solenoid 60 for withdrawing the latch plate 54. The resetting switch will then open and plunger 44 will rise as the actuating lever 32 is rocked due to the weight of the lifting block and receiver. The switch 92 then operates to break the circuit supplying power to the recorder and the circuits through which the current is supplied to the motor 142 of the timing mechanism is also broken. The timer is thus stopped but the delay incident to the operation of the various elements will allow the leaf actuator cam follower 174 engaging the circuit breaking cam 143 to move up out of the sharp recess 158 so that the mechanism is restored to its original position and is in readiness to follow through a succeeding cycle of operations for transmitting and receiving another message. Any desired number of messages may thus be successively transmitted and received as long as there is any wire remaining on the supply spool 12 of the recorder 10.

When the party using the present invention returns to the office or telephone, the messages impressed on the wire 16 may be read back and may be repeated as often as desired, in order to be sure that they are properly understood.

The duration of any cycle may of course be more or less than two minutes and the duration and sequence of the transmitting and receiving operations may be varied by the use of a suitable repeater timing mechanism and switching cams. It will also be apparent that an ordinary microphone may be used in place of the inductive pick-up device 5 for receiving the incoming message and impressing it upon the wire of the recorder. It will further be evident that the particular type of recorder employed may be varied and any of a number of such recording devices now on the market and in conventional use may be employed. Moreover, the present apparatus does not involve any alteration in the existing telephone circuits and by the use of an acoustically actuated signal responsive relay 20 there need be no physical connection between the applicant's apparatus and that of the existing telephone circuits.

These and other changes and modifications may be made in the form, construction and arrangement of the various elements of the combination, and in view thereof it should be understood that the embodiment of the invention shown in the drawings and described above is intended to be illustrative only and is not intended to limit the scope of the invention, as set forth in the appended claims.

I claim:

1. A system for automatically transmitting and receiving telephone messages comprising a telephone circuit including a receiver, a support for said receiver, a lever pivotally movable to raise and lower said receiver to complete and break the telephone circuit, an actuating circuit including a solenoid connected to said lever for actuating the lever, means in said actuating circuit responsive to an incoming signal for completing and maintaining said circuit, time delay means in said circuit for delaying operation of said solenoid to raise the receiver for a predetermined time after the actuating circuit is completed, a transmitting and recording device, a control circuit for said device operable to control the sequence and duration of the transmitting and recording operations of said device, and switch means actuated by movement of said lever for completing and breaking said control circuit.

2. A system for automatically transmitting and receiving telephone messages comprising a telephone circuit including a receiver, a support for said receiver, a lever pivotally movable to raise and lower said receiver to complete and break the telephone circuit, an actuating circuit including a solenoid connected to said lever for actuating the lever, means in said actuating circuit responsive to an incoming signal for completing said circuit, a relay responsive to the flow of current in said actuating circuit for maintaining said circuit, time delay means in said circuit for delaying operation of said solenoid to raise the receiver for a predetermined time after the actuating circuit is completed, a transmitting and recording device, a control circuit for said device operable to control the sequence and duration of the transmitting and recording operations of said device, switch means actuated by movement of said lever for completing and breaking said control circuit, and means responsive to movement of said lever to complete said control circuit for breaking said actuating circuit.

3. A system for automatically transmitting and receiving telephone messages comprising a telephone circuit including a receiver, a support for said receiver, a lever pivotally movable to raise and lower said receiver to complete and break the telephone circuit, an actuating circuit including a solenoid connected to said lever for actuating the lever, means in said actuating circuit responsive to an incoming signal for completing and maintaining said circuit, time delay means in said circuit for delaying operation of said solenoid to raise the receiver for a predetermined time after the actuating circuit is completed, latch means for holding said lever in position to maintain the receiver raised, a transmitting and recording device, a control circuit for said device operable to control the sequence and duration of the transmitting and recording operations of said device, switch means actuated by movement of said lever for completing and breaking said control circuit, and means in said control circuit for actuating said latch to release the lever and allow the receiver to be lowered to break the telephone circuit.

M. KURT von ZIMMERMANN.

REFERENCES CITED

The following references are of record in the file of this patent:

UNITED STATES PATENTS

| Number | Name | Date |
|---|---|---|
| 909,414 | Hytten | Jan. 12, 1909 |
| 1,973,091 | Keiser | Sept. 11, 1934 |
| 2,005,788 | Keiser | June 25, 1935 |
| 2,261,420 | Shively | Nov. 4, 1941 |
| 2,393,272 | Van Deventer | Jan. 22, 1946 |